Jan. 18, 1955   R. E. GOULD ET AL   2,699,591
METHOD OF MAKING APPENDAGED ARTICLES
Filed March 4, 1950   2 Sheets-Sheet 1

INVENTORS
Robert E. Gould
Albert J. Wahl
Hemen Mead
By George J. Arminger
ATTORNEY

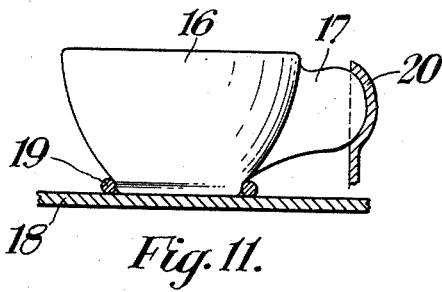
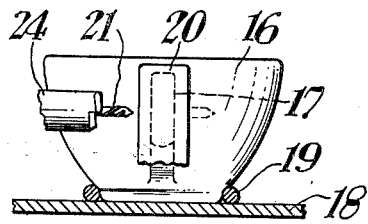
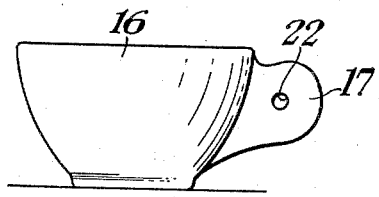
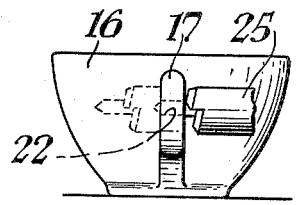
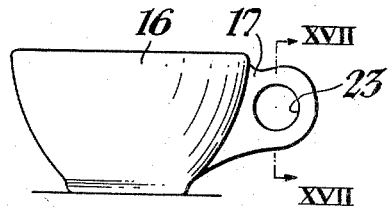
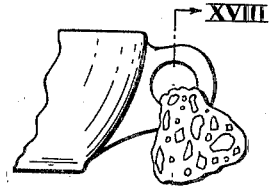
INVENTORS
Robert E. Gould
Albert J. Wahl
Hemen Mead

United States Patent Office 2,699,591
Patented Jan. 18, 1955

2,699,591

METHOD OF MAKING APPENDAGED ARTICLES

Robert E. Gould, East Aurora, Albert J. Wahl, Brocton, and Hemen Mead, Snyder, N. Y., assignors to Buffalo Pottery Inc., Buffalo, N. Y., a corporation of New York Application March 4, 1950, Serial No. 149,298

1 Claim. (Cl. 25—156)

This invention relates to a method of making appendaged articles. It has to do particularly with making appendaged potteryware, for instance, hotelware cups.

It is among the objects of this invention to provide for a method of producing appendaged potteryware which will eliminate the necessity for separately preforming and adhesively attaching the appendage to the article; which will enable rapid production of the ware in question, which will produce ware with uniformly located strong handles, and which requires a minimum of manual intervention.

The customary way of making cups is to jigger the body of the article and, when the article has dried sufficiently, to attach thereto a preformed handle using liquid slip for an adhesive. The process requires special skills and equipment for both jiggering and handle preforming operations respectively. Furthermore differences in the amount or degree of shrinkage, as between the handle and cup, often result in warped or sprung handles. Generally speaking, the process is slow, expensive and none too reliable.

In accordance with this invention, a jigger mold is provided having a handle cavity formed in the wall of the molding cavity into which a charge of plastic clay is pressed to form a handle blank and then, the remainder of the ware is pressed and jiggered in the molding cavity to form a one piece article. When the ware has dried and shrunk sufficiently it is removed from the mold and air dried for a further interval if desired and then the handle blank is mechanically drilled out to form a finger hole. The body of the article, including the handle is then sponged which completes the clay state processing.

The preferred embodiment of the invention is illustrated in the accompanying drawings wherein:

Figure 11 is a side elevation of the ware illustrating how the ware is held preparatively to forming a finger hole in the handle portion.

Figure 12 is an end view of the handle and cup illustrating the first step in the hole forming operations which is preformed as by drilling.

Figure 13 is a view of the cup similar to Figure 8 showing the first hole produced in the handle portion.

Figure 14 is a view similar to Figure 10 illustrating the final step in the hole forming operation.

Figure 15 is a view similar to Figure 8 showing the cup after the final hole drilling operation.

Figure 16 is a fragmentary view of the cup showing how the handle in the region of the hole is sponged.

Figure 17 is a section taken on line XVII—XVII of Figure 15.

Figure 18 is a section taken in line XVIII—XVIII of Figure 16.

We have described our invention as the same would be practiced or used in connection with the manufacture of hotelware cups however this is not to be considered as a limitation because the invention may be practiced in connection with making other appendaged articles, for instance, dinnerware cups, handied soups etc. to name a few examples.

The molds used in our process are jigger molds. They are made of plaster, either machine mix or other suitable variety. The construction of the mold differs from conventional molds in that the upper part of the mold is thicker so as to provide a greater concentration of absorbent material to insure adequate absorption of the moisture from the clay in the handle portion and also to provide a stronger mold to withstand the side thrust incident to the pressure molding operation involved in forming the handle.

Generally speaking, the process includes the operations of first placing a body of plastic ceramic material in a mold and then forcing some of the material into a handle forming cavity communicating with but offset in the body of the mold from the cup molding cavity. We sometimes refer to this operation as pressure molding. Then, from the remainder of the ceramic material we preform the body of the article, which for convenience we shall call the cup as distinguished from the handle. Both parts are made from the same parent body of material, and whilst the same is in the plastic state. They form a unitary whole and can be considered as one piece rather than a composite article made up of several parts, separately produced and adhesively joined.

It is conceivable that the parent body of material could be pressed and in one operation forced into the handle molding cavity and spread over the cup molding surface. After this preparatory operation or operations the cup is jiggered, dried, removed from the mold and a finger hole produced in the handle portion.

Figure 1:
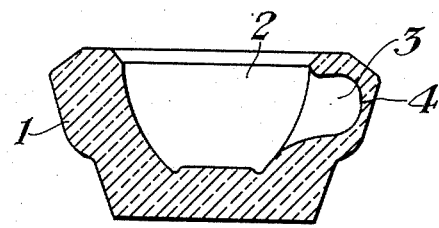
Figure 1 is a section through a form of plaster mold which can be employed in the process showing the molding cavity.

With reference to Figure 1, the plaster mold 1 has a cup shaped molding cavity 2 and a handle cavity 3 communicating therewith. The handle cavity 3 is offset in the thickened upper region of the mold and in order not to unduly weaken the mold, a substantial amount of stock may remain between the rear of cavity 3 and the outside of the mold as at 4. As will be noted as this discussion progresses, the clay is forced by pressure into the cavity 3 and a thick section at the rear of the cavity is preferred to a thin section to avoid rupture.

The handle cavity 3 may be rounded at the bends to minimize dry state processing and also to facilitate removal of the handle from the cavity. These may be compound curved surfaces and the intersecting walls of the cup cavity 2 and the handle cavity 3 are preferably filleted so as to help produce smooth, unbroken curved surfaces in the final product at zones normally maned by juncture lines.

Figure 3:
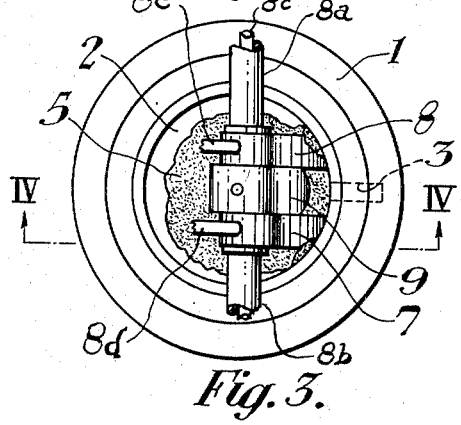
Figure 3 is a plan view illustrating the mechanical presser inside the mold in position to fill the handle cavity.

The side walls of the handle cavity are preferably straight and parallel, see Figure 3, but the bottom of the cavity curves upwardly and rearwardly from the zone of the cup molding cavity to provide a wide, vertically flaring entrance. The entire handle cavity 3, it will be noted, lies with a slight upward tilt relative to the base of the cup cavity.

A charge of plastic clay of the consistency of that normally used for hotelware jiggering operations is placed in the bottom of molding cavity 2. The charge may be a wad or lump of clay 5 as shown or a machine cut pug or slice of material as illustrated in dotted outline. A high pile is desired, preferably one that comes above the median line of the handle molding cavity.

Some of the clay comprising this wad or pug of material is then thrust into the handle molding cavity 3. It is desirable to support the mold against displacement during this operation and a backstop 6, Figure 4, of any suitable form may be provided.

Figure 4:
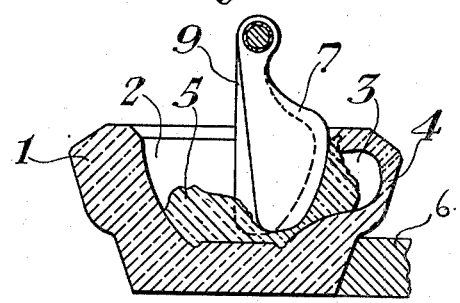
Figure 4 is a sectional view taken on line IV—IV of Figure 3 showing how clay is forced into the handle offset of the molding cavity.

One example of mechanical apparatus which may be employed to fill the handle cavity 3 with clay is shown in Figures 3 and 4. This apparatus includes a pair of flat sided, movable members 7 and 8 mounted in spaced relation and adapted to straddle but not enter the entrance to cavity 3. The forward or working side of these members is curved so as to be complemental to the curvature of the molding surface of cavity 2.

Member 8 is secured to a hollow shaft 8a and is movable therewith. Member 7 is secured to a hollow shaft 8b and is movable therewith. These two hollow shafts are sleeved on shaft 8c. The clay injection member 9, which is similar in form to members 7 and 8, is secured to shaft 8c and lies in the slot formed by members 7 and 8. Thus, members 7, 8, and 9 are movable as a unit into and out of the molding cavity and members 7 and 8 are rotatable in unison relative to member 9. 8d and 8e represent flame jets, the purpose being to heat members 7, 8 and 9 to a temperature which will render them non-adhesive to clay.

The operation performed by this apparatus is as follows: After the mold is charged with clay, members 7, 8, and 9 are inserted in the cavity 2 with member 9 in a rearward position so as to provide a gap between members 7 and 8 that becomes filled or partly filled with clay. Members 7 and 8 move forwardly (or radially relative to the vertical axis of the mold) against a clay cushion until a substantial seal is formed with the wall of the molding cavity on opposite sides of the entrance to cavity 3. The clay in the gap between members 7 and 8 is thus partly isolated and member 9 is then moved to thrust the clay in the gap into the handle cavity 3.

Figure 10:
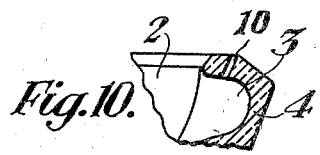
Figure 10 is a fragmentary view illustrating the handle cavity section of the mold and showing how the same may be vented.

The packing or ramming of the material into the handle cavity is preferably accompanied by an upward thrusting motion of member 9 so as to force any air in the cavity to escape at the top of the entrance to handle cavity 3. Moreover, the handle cavity may be vented as at 10, Figure 10, to allow air to escape. Should the vent become plugged with clay, the material will dry out and may be easily removed from the hole between fillings.

The operation just described could be performed by other means and conceivably with the fingers of the hand where the clay is sufficiently soft. In any event, the idea is to ram or pack the clay into the handle cavity with appreciable pressure, uniformly applied and with minimum loss of material due to back or side flow.

Figure 2:
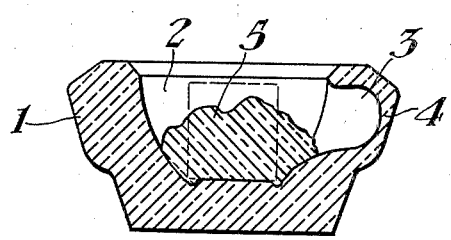
Figure 2 is a section through the plaster mold of Figure 1 showing a charge of clay in the molding cavity.
Figure 5:
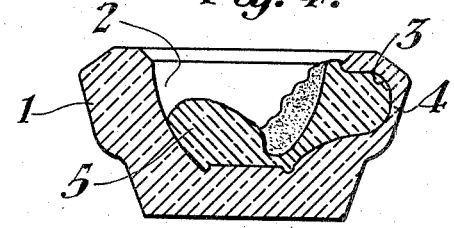
Figure 5 is a sectional view through the mold showing the mold and contents after completion of the operation illustrated in Figure 4 and with the pressing tool withdrawn.

The operations just described are not intended to separate the source material into individual bodies. It is rather a relocation of some of the source material, compare Figure 2 with Figure 5, without completely dividing the material, however, this invention comprehends within its scope the steps of first filling the handle cavity with a wad of plastic jigger clay before introducing the main charge of clay from which the remainder of the body of the article is made into the mold. The material for both handle and cup bodies would in such event be in the plastic state and suitable for blending in the plastic state by subsequent operations to be presently described.

As the next step in the sequence, the remainder of the source material is run up the side of the molding cavity 3 and this operation spreads the material over the inside of the molding cavity 2 to a predetermined thickness and blends the handle material with the cup body material. The members 7, 8, and 9 are of course first removed from the mold and if the operation is performed by metal implements they are preferably heated or otherwise treated to render them non-adhesive so the clay will not stick thereto.

Figure 6:
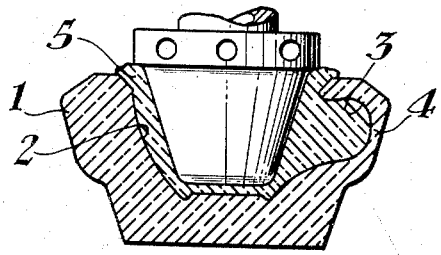
Figure 6 is a sectional view through the mold showing how the body of the article may be formed with a press die after the handle offset has been filled with clay.
Figure 7:
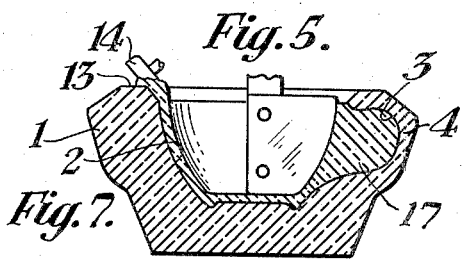
Figure 7 is a section through the mold of Figure 1 illustrating the profiling step which may follow the pressing step illustrated in Figure 6 or may be substituted therefor.

The operation of running up the clay may be performed by the flat side of the hand whilst rotating the mold, however a speedier method is to press the clay in the molding cavity with a hot, male die 11, Figure 6, or spread the material by rotating the profile tool 12, Figure 7, or the mold or both in which case the material would be spread and jiggered by the same implement. Thus the invention comprehends at this stage the operations of spreading (as by pressing or rotation) followed by jiggering or the simultaneous performance of the two operations. During jiggering operations, the excess material accumulating on the brim 13 of the mold can be removed by a scrapper tool 14, Figure 7.

After the ware is formed, the mold and contents are set aside to dry. This operation may be accelerated by exposing the contents to radiant heat or to a forced draft of warm air. In commercial practice the molds are set on a conveyor and carried through a dryer (not shown) to dehydrate the article.

Figure 8:
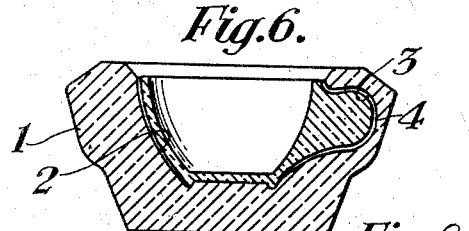
Figure 8 is a sectional view illustrating how the formed article shrinks away from the molding cavity upon drying.

Upon the loss of a given quantity of liquid constituents, the plastic body becomes hardened and stabilized. During this interval the clay releases from the mold and shrinks away from the molding cavity. This is illustrated in Figure 8 by the clearance space between the cup body 16, its handle portion 17, and the wall of the handle and cup molding cavities.

Figure 9:
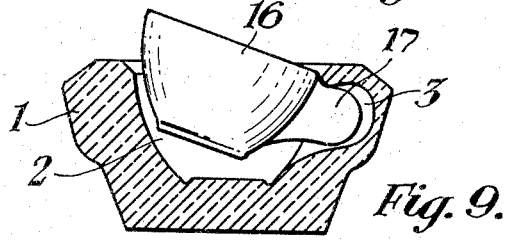
Figure 9 is a sectional view illustrating how the ware is removed from the mold.

Owing to this shrinkage, the cup may easily be removed from the mold by lifting up on the edge opposite the handle (Figure 9) and turning the cup upwardly to slip the handle 17 out of the handle cavity 3.

The cup may be considered as finished insofar as clay state operations are concerned at this juncture except for sponging the exterior however if a hole is desired in the handle the following operations may now be performed or may be performed after the cup has air dried for an interval.

The cup 16, Figure 11, is set on a holder 18 having a means of preventing displacement such as a ring 19 and a stabilizing member 20, shaped to fit the rear of the handle is positioned there against. Then, a drill 21, Figure 12, is moved against the side of the handle and a pilot hole 22, Figure 13, is drilled completely through. This hole is smaller than the ultimate diameter of the finger hole 23, Figure 15, which is produced by right and left finger hole size drills or reamers 24, and 25, Figures 13 and 15.

The reamer 24 preferably follows drill 21 through from the left, Figure 12, and then without disturbing the cup, reamer 24 and drill 21 are withdrawn and the hole is reamed out from the opposite side. The straight bore thus produced, Figure 17, is thereafter rounded by sponging as illustrated in 14, to produce the conventional handle section illustrated in Figure 18. Since the rear of the handle may be shaped by the mold, there is no further processing of this portion of the handle would be required except for the conventional all over sponging normally given the cup and handle. However, the handle may be externally shaped if desired by cutting, trimming or carving.

The cup and handle may be removed from the mold and the finger hole formed in the leather hard state. When this is done the cup is air dried after the hole is formed for an interval until it is ready for bisque firing or if the product is to be once fired, then until the ware is in proper condition for glazing and firing. If the ware is two fired, then it is bisque fired, cleaned, glazed and glost fired.

By virtue of our process, a stronger article is produced having clean, smooth lines at the zone where the handle joins the cup. There is no break in the lines of the article in this region and cracks or crevices are not apt to develop as the result of strain or warpage or improper fit because the material from which the ware is made is uniform as to moisture content, plasticity, and constituents commencing with the first clay state forming operations and from this point on receive the same drying treatment. There are no harmful differentials in materials, drying treatment or moisture content to contend with.

We wish to have it understood that the method hereof may be practiced otherwise than as specifically described within the scope of the appended claim.

It should be noted in passing that the press implement, which we may call a matrix or die, should be non-adhesive to clay so as not to impair the adhesive bond between the clay and mold. The same is true for members 7, 8, and 9 because otherwise, the clay might be pulled out of the handle cavity or loosened from the molding surface upon withdrawal of the members. The die and members are all heated to render them non-adhesive to clay.

We claim:

A method of making appendaged potteryware in a one piece jigger mold having a ware molding cavity of generally circular cross section and an appendage cavity communicating therewith and extending generally radially therefrom which comprises introducing a charge of plastic material into the ware molding cavity adjacent the appendage cavity, confining said charge against spreading in a circumferential direction, applying pressure in a radial direction to the charge while thus confined to fill the appendage cavity, introducing an additional charge into the ware molding cavity, and profiling the same without confinement against circumferential spreading so as to line the ware molding cavity with charge material integrally united with charge material in the appendage cavity.

References Cited in the file of this patent

UNITED STATES PATENTS

| Number | Name | Date |
|---|---|---|
| 83,515 | Loomis | Oct. 27, 1868 |
| 86,243 | Newkumet | Jan. 18, 1869 |
| 265,540 | Robinson et al. | Oct. 3, 1882 |
| 356,774 | Mayer | Feb. 1, 1887 |
| 520,294 | Boch | May 22, 1894 |
| 656,505 | Brannagan | Aug. 21, 1900 |
| 774,765 | Locke | Nov. 15, 1904 |
| 1,677,611 | Bailey | July 17, 1928 |
| 1,740,757 | Westerfield | Dec. 24, 1929 |
| 1,918,496 | Tarter et al. | July 18, 1933 |
| 2,180,895 | Doll | Nov. 21, 1939 |
| 2,183,944 | Salisbury | Dec. 19, 1939 |
| 2,282,372 | Miller | May 12, 1942 |
| 2,374,339 | Emerson | Apr. 24, 1945 |
| 2,379,737 | Miller | July 3, 1945 |

FOREIGN PATENTS

| Number | Country | Date |
|---|---|---|
| 4,877 | Great Britain | Mar. 29, 1915 |
| 15,308 | Great Britain | June 3, 1915 |